United States Patent [19]
Weber et al.

[11] Patent Number: 6,140,409
[45] Date of Patent: *Oct. 31, 2000

[54] ANTIDRIP AGENTS FOR THERMOPLASTIC MOLDING COMPOUNDS

[75] Inventors: Martin Weber, Maikammer; Jürgen Hofmann, Ludwigshafen; Robert Weiss, Kirchheim; Walter Heckmann, Weinheim; Roland Hingmann, Ladenburg; Josef Wünsch, Schifferstadt; Graham Edmund McKee, Neustadt, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/981,687
[22] PCT Filed: Jun. 27, 1996
[86] PCT No.: PCT/EP96/02803
  § 371 Date: Jan. 5, 1998
  § 102(e) Date: Jan. 5, 1998
[87] PCT Pub. No.: WO97/02299
  PCT Pub. Date: Jan. 23, 1997

[30] Foreign Application Priority Data
  Jul. 6, 1995  [DE]  Germany ............ 195 24 585

[51] Int. Cl.⁷ ........................................ C08L 75/00
[52] U.S. Cl. ............................ 524/508; 524/577
[58] Field of Search ................................ 524/577, 508

[56] References Cited

U.S. PATENT DOCUMENTS

| | | | |
|---|---|---|---|
| 2,694,692 | 11/1954 | Amos et al. | 260/45 |
| 2,862,906 | 12/1958 | Stein et al. | 260/45 |
| 4,128,602 | 12/1978 | Katchman et al. | 260/876 |
| 4,128,603 | 12/1978 | Katchman et al. | 260/876 |
| 4,360,618 | 11/1982 | Tremontozzi | 524/141 |
| 4,405,753 | 9/1983 | Deets et al. | 525/68 |
| 5,008,314 | 4/1991 | Lee, Jr. | 524/143 |

FOREIGN PATENT DOCUMENTS

| | | |
|---|---|---|
| 305 764 | 3/1989 | European Pat. Off. . |
| 476 366 | 3/1992 | European Pat. Off. . |
| 550 204 | 7/1993 | European Pat. Off. . |
| 87/00540 | 1/1987 | WIPO . |

OTHER PUBLICATIONS

*Ullman's Enc. der techn. Chem.*, vol. 19, pp. 265–272, 1980.
Fried et al., *Polymer Eng. Sci.*, vol. 22, 1982, pp. 705 ff.
*Ullman's Enc. der tech. Chem.*, vol. 19, 1980, pp. 73 ff.
Illers et al., *Kolloidzeitschrift*, 190 (1), 16–34, 1963.

*Primary Examiner*—Peter D. Mulcahy
*Attorney, Agent, or Firm*—Keil & Weinkauf

[57] ABSTRACT

Halogen-free antidrip agents for thermoplastic molding materials contain polymers based on vinylaromatic monomers and having molecular weights ($M_w$) of at least 800 000 g/mol and a narrow molecular weight distribution.

4 Claims, No Drawings

ANTIDRIP AGENTS FOR THERMOPLASTIC MOLDING COMPOUNDS

The present invention relates to antidrip agents for thermoplastic molding materials which contain polymers which are based on vinylaromatic monomers and have molecular weights ($M_w$) of at least 800 000 g/mol and a narrow molecular weight distribution. Preferred embodiments are described in the subclaims and the description.

When thermoplastic materials are ignited, they generally soften very rapidly (unless crosslinking reactions occur) since their viscosity decreases markedly owing to the high temperatures. Frequently, therefore, particles of the material separate off from the molding. This process is referred to as dripping or, if the sample is still burning, as the dripping of flaming particles. Dripping material particles can readily ignite other articles and thus propagate a fire. Considerable efforts have therefore been made to develop effective antidrip agents for thermoplastic molding materials.

Although halogen-containing polymers, such as polytetrafluoroethylenes, counteract dripping, they should be avoided for reasons of environmental compatibility. EP-A-550 204 describes high molecular weight polyethylenes as halogen-free antidrip agents for thermoplastic molding materials comprising polyphenylene ethers and high impact polystyrenes (HIPS). However, it has been found that even small amounts of high molecular weight polyethylene adversely affect the mechanical properties of precisely these molding materials. In particular, the damaging energy decreases dramatically. EP-A-305 764 recommends polystyrenes having molecular weights of more than 400 000 g/mol and a broad molecular weight distribution as antidrip agents for blends of polyphenylene ethers and HIPS. On the one hand, these antidrip agents do not sufficiently decrease the tendency of the thermoplastic molding materials to drip and, on the other hand, they increase the melt viscosity at the shear rates relevant to processing by injection molding. Furthermore, the toughness of the molding materials is reduced as the proportion of antidrip agent increases.

That blends of polyphenylene ethers and HIPS may additionally contain polystyrenes is furthermore disclosed, for example, in U.S. Pat. No. 4,128,602, 4,128,603 and 5,008,314 and EP-A-476 366. The molding materials described in U.S. Pat. No. 5,008,314 have improved stress cracking resistances and those of EP-A-476 366 are particularly suitable for blow molding.

It is an object of the present invention to provide novel effective halogen-free antidrip agents for thermoplastic molding materials, in particular for polyphenylene ether/HIPS blends, which have very little effect on the mechanical properties of the blends.

We have found that this object is achieved by the antidrip agents defined at the outset.

The polymers contained in the novel halogen-free antidrip agents and based on vinylaromatic monomers may be both homopolymers and random copolymers or block copolymers, such as alternating block copolymers, star block copolymers or three-block or five-block copolymers. Blends of different polymers are also suitable. Homopolymers are preferably used. The polymers based on vinylaromatic monomers may be either syndiotactic or atactic. In general, however, atactic polymers based on vinylaromatic monomers are used.

Suitable vinylaromatic monomers have, as a rule, 8 to 12 carbon atoms. Styrene or styrenes substituted in the nucleus or in the side chain are particularly suitable. Examples are o-methylstyrene, m-methylstyrene, p-methylstyrene and p-tert-butylstyrene.

Other monomers may also be present, in particular those which are capable of anionic copolymerization with the stated monomers. These include acrylonitrile, methacrylonitrile, 2-vinylpyridine, 4-vinylpyridine and vinylpyrrolidone.

Very particularly preferred novel antidrip agents contain polystyrene homopolymers.

According to the invention, the polymers based on vinylaromatic monomers have weight average molecular weights ($M_w$) of at least 800 000, for example 900 000, g/mol or more. In general, the molecular weights ($M_w$) are from 800 000 to $2.8 \times 10^6$, preferably from $1 \times 10^6$ to $2.5 \times 10^6$, g/mol. In general, polymers based on vinylaromatic monomers and having molecular weights ($M_w$) of more than $3 \times 10^6$ g/mol are difficult to prepare and are therefore not preferred. In a particularly preferred embodiment, the molecular weights ($M_w$) are from $1.1 \times 10^6$ to $2.3 \times 10^6$, in particular from $1.2 \times 10^6$ to $2.2 \times 10^6$, g/mol. The novel antidrip agents can be used in various thermoplastic molding materials. It is particularly advantageous to use the novel antidrip agents in thermoplastic molding materials which are compatible with the novel antidrip agents. This means that the novel antidrip agents are preferably miscible with the matrix of the thermoplastic molding material or can be readily dispersed therein.

According to the invention, the polymers based on vinylaromatic monomers have a narrow molecular weight distribution, ie. the ratio of weight average to number average molecular weights $M_w/M_n$ is small. The ratio $M_w/M_n$ is preferably 2.5 or less. $M_w/M_n$ is particularly preferably 2 or less, for example less than 1.8.

The polymers based on vinylaromatic monomers which are contained in the novel antidrip agents are preferably prepared by anionic polymerization. Anionic emulsion polymerization is particularly preferred.

Anionic polymerization methods are known per se. In general, the polymerization is carried out in the presence of stoichiometric amounts of organic lithium compounds, preferably alkyllithium compounds, in particular n-butyllithium, sec-butyllithium or tert-butyllithium.

In the anionic emulsion polymerization, the reaction is carried out as a rule in an inert solvent in which the polymer is insoluble. The reaction may also be effected in a solvent mixture comprising short-chain and long-chain aliphatic hydrocarbons.

The suitable solvents include butane, isobutane, pentane, isopentane, hexane, heptane, 2,2-dimethylbutane, petroleum ether and cyclohexane. These may be used as a mixture with hydrocarbons which are of 14 carbon atoms or more, including tetradecane, hexadecane, octadecane or eicosane, and liquid oligomers of olefins, such as ethylene or higher olefins of 3 to 12 carbon atoms, such as decene.

Solid oligomers of the stated olefins or polystyrenes or polysiloxanes having a low molecular weight may also be used as cosolvents.

The reaction can also be carried out in the presence of polymeric dispersants which keep the resulting polymer in suspension. Examples of suitable dispersants are copolymers of styrene and butadiene, isoprene or hydrogenated isoprenes.

Very particularly preferably, pentane is used as the solvent and styrene/butadiene block copolymers as dispersants.

Suitable styrene/butadiene block copolymers are, for example, two-block copolymers of the type a-b, where a is a polymer block of styrene and b is a polymer block of butadiene, preferably 1,4-polybutadiene. The sum of the components a and b is 100% by weight, and the composition of a and b may vary. Thus, a may be from 10 to 90% by weight and accordingly b from 90 to 10% by weight, but a is preferably from 20 to 80% by weight and b from 80 to 20% by weight.

For example, the commercial products ®Nippon NS 312, ®Buna KA 8497, ®Kraton G 1701X and ®Septon 1001 are suitable.

A particularly suitable styrene/butadiene block copolymer is, for example, a styrene/butadiene two-block copolymer which may be hydrogenated and which is used in an amount of, for example, from 1 to 10% by weight, based on the vinylaromatic monomer. It is advantageously added in the form of a solution in the monomer to the emulsion to be polymerized.

Compounds which promote the tendency toward a random distribution may be present in the preparation of random copolymers. Such compounds are, for example, tetrahydrofuran, tetramethylethylenediamine, potassium amylate and tert-butyl phosphate.

The polymerization process is generally carried out at from 0 to 100° C. Preferred reaction temperatures are from 0 to 30° C. The reaction can be carried out both at atmospheric pressure and at superatmospheric pressure.

It is generally sufficient if the antidrip agents are contained in small amounts, for example from about 0.5 to 25% by weight, based on the total composition, in the thermoplastic molding materials. Preferred compositions of thermoplastic molding materials and antidrip agents contain from 1 to 20, in particular from 1 to 15, % by weight of antidrip agents.

The novel antidrip agents are preferably used in compositions which contain polyphenylene ethers and vinylaromatic polymers.

Particularly preferred compositions are those which contain

A) from 0.5 to 25% by weight of an antidrip agent as claimed in any of claims 1 to 4, B) from 5 to 97.5% by weight of polyphenylene ether, C) from 1 to 93.5% by weight of vinylaromatic polymers which differ from the polymers contained in the antidrip agent, D) from 0 to 50% by weight of impact modifiers, E) from 1 to 20% by weight of flameproofing agents and F) from 0 to 60% by weight of additives or processing assistants or of mixtures thereof.

Component A

According to the invention, the novel antidrip agents are contained in the compositions as component A in an amount of from 0.5 to 25, preferably from 0.5 to 15, in particular from 0.5 to 10, % by weight, based on the total composition.

Component B

According to the invention, the polyphenylene ethers B are contained in the compositions in an amount of from 5 to 97.5, preferably from 10 to 93.5, in particular from 15 to 88.5, % by weight, based on the total composition.

The polyphenylene ethers B are known per se. They are compounds based on substituted, in particular disubstituted, polyphenylene ethers, the ether oxygen of one unit being bonded to the benzene nucleus of the neighboring unit. Polyphenylene ethers substituted in the 2- and/or 6-position relative to the oxygen atom are preferably used. Examples of substituents are halogen, such as chlorine or bromine, and alkyl of 1 to 4 carbon atoms which preferably has no α tertiary hydrogen atom, for example methyl, ethyl, propyl or butyl. The alkyl radicals in turn may be substituted by halogen, such as chlorine or bromine, or by hydroxyl.

Further examples of possible substituents are alkoxy, preferably of up to 4 carbon atoms, or phenyl which is unsubstituted or substituted by halogen and/or alkyl. Copolymers of different phenols, for example copolymers of 2,6-dimethylphenol and 2,3,6-trimethylphenol, are also suitable. Mixtures of different polyphenylene ethers can of course also be used.

Examples of polyphenylene ethers B are
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2,6-dichloro-1,4-phenylene ether),
poly(2-methyl-6-phenyl-1,4-phenylene ether),
poly(2,6-dibenzyl-1,4-phenylene ether),
poly(2-ethoxy-1,4-phenylene ether),
poly(2-chloro-1,4-phenylene ether) and
poly(2,5-dibromo-1,4-phenylene ether).

Polyphenylene ethers in which the substituents are alkyl of 1 to 4 carbon atoms, such as
poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether) and
poly(2-ethyl-6-propyl-1,4-phenylene ether), are preferably used.

For the purposes of the present invention, polyphenylene ethers are also to be understood as meaning those which are modified with monomers such as fumaric acid, maleic acid or maleic anhydride.

Such polyphenylene ethers are described, inter alia, in WO 87/00540.

With regard to the physical properties of the polyphenylene ethers, those which have a weight average molecular weight $M_w$ of from 8 000 to 70 000, preferably from 12 000 to 50 000, in particular from 20 000 to 45 000, are used in the compositions.

This corresponds to a limiting viscosity of from 0.18 to 0.7, preferably from 0.25 to 0.55, in particular from 0.30 to 0.50, dl/g, measured in chloroform at 25° C.

The molecular weight distribution is determined in general by means of gel permeation chromatography (Shodex separation columns 0.8×50 cm of the types A 803, A 804 and A 805, with tetrahydrofuran as eluent at room temperature). The polyphenylene ether samples are dissolved in tetrahydrofuran under pressure at 110° C., 0.16 ml of a 0.25% strength by weight solution being injected.

Detection was effected in general by means of a UV detector. The calibration of the columns was carried out with polyphenylene ether samples whose absolute molecular weight distributions were determined by a GPC/laser light scattering combination.

Component C

According to the invention, component C is contained in the compositions in amounts of from 1 to 93.5, preferably from 5 to 88.5, in particular from 10 to 83.5, % by weight, based on the total weight of the composition.

Component C comprises vinylaromatic polymers which are preferably compatible with the polyphenylene ether used. The vinylaromatic polymers C differ from the polymers contained in the antidrip agent.

Both homopolymers and copolymers of vinylaromatic monomers of 8 to 12 carbon atoms, which are prepared in the presence of a rubber, are suitable. The rubber content is from 5 to 25, preferably from 8 to 17, % by weight.

High impact polystyrenes or copolymers of styrene and other vinylaromatic compounds are particularly suitable. Such high impact polystyrenes are generally referred to as HIPS and for the most part are commercially available and have a viscosity number (VN) of the hard matrix of from 50 to 130, preferably from 60 to 90, ml/g (0.5% strength in toluene at 23° C.).

Suitable monovinylaromatic compounds are styrenes alkylated in the nucleus or in the side chain. Examples are chlorostyrene, α-methylstyrene, p-methylstyrene, vinyltoluene and p-tert-butylstyrene. However, styrene alone is preferably used.

The homopolymers are generally prepared by the known mass, solution or suspension polymerization methods (cf. Ullmanns Enzyklopädie der techn. Chemie, Volume 19, pages 265 to 272, Verlag Chemie, Weinheim 1980). The homopolymers may have weight average molecular weights $M_w$ of from 3 000 to 300 000, which can be determined by conventional methods.

Examples of suitable comonomers for the preparation of copolymers are (meth)acrylic acid, alkyl (meth)acrylates where the alkyl radical is of 1 to 4 carbon atoms, acrylonitrile and maleic anhydride and maleimides, acrylamide and methacrylamides and their N,N- or N-alkyl-substituted derivatives where the alkyl radical is of 1 to 10 carbon atoms.

Depending on their chemical structure, the comonomers are present in varying amounts in the styrene polymers. The miscibility of the copolymer with the polyphenylene ether is decisive with regard to the content of comonomers in the copolymer. Such mixing limits are known and are described, for example, in U.S. Pat. Nos. 4,360,618 and 4,405,753 and in the publication by J. R. Fried and G. A. Hanna, Polymer Eng. Sci. 22 (1982), 705 et seq.. The copolymers are prepared by known methods, which are described, for example, in Ullmanns Enzyklopädie der techn. Chemie, Volume 19, page 273 et seq., Verlag Chemie, Weinheim (1980). The copolymers generally have a weight average molecular weight ($M_w$) of from 10 000 to 300 000, which can be determined by conventional methods.

Component C is preferably high impact polystyrene.

The generally used processes for the preparation of toughened styrene polymers are mass and solution polymerization in the presence of a rubber, as described, for example, in U.S. Pat. No. 2,694,692, and mass-suspension polymerization processes, as described, for example, in U.S. Pat. No. 2,862,906. Other processes can of course also be used, provided that the rubber phase is brought to the desired particle size.

Component D

According to the invention, the impact modifiers D are contained in the compositions in an amount of from 0 to 50% by weight, based on the total composition. Preferred compositions contain from 0 to 40, in particular from 0 to 20, % by weight of component D.

Natural or synthetic rubbers may be used as component D. In addition to natural rubber, other suitable impact modifiers are, for example, polybutadiene, polyisoprene or copolymers of butadiene and/or of isoprene with styrene and other comonomers, which have a glass transition temperature of less than −20° C., determined according to K. H. Illers and H. Breuer, Kolloidzeitschrift 190 (1) (1963), 16–34.

Preferred impact modifiers D are block copolymers of vinylaromatics and dienes, which are distinguished by the fact that a soft block comprising diene and vinylaromatic is present instead of a pure diene rubber, diene and vinylaromatic being randomly distributed in the soft block.

Preferred vinylaromatics are styrene, α-methylstyrene, vinyltoluene and mixtures of these compounds. Preferred dienes are butadiene, isoprene, piperylene, 1-phenylbutadiene or mixtures of these compounds. A particularly preferred monomer combination is butadiene and styrene.

The soft blocks are particularly preferably composed of from 31 to 75% by weight of styrene and from 25 to 69% by weight of butadiene. Soft blocks which have a butadiene content of from 34 to 69% by weight and a styrene content of from 31 to 66% by weight are very particularly preferred.

Block copolymers comprising styrene and butadiene and having a monomer composition of from 15 to 66, in particular from 25 to 62, % by weight of diene and from 34 to 85, in particular from 38 to 75, % by weight of vinylaromatic are particularly preferred.

The proportion by volume of the soft block in the solid block copolymer is in general from 60 to 95, preferably from 70 to 90, in particular from 80 to 88, % by volume. The proportions by volume of the hard phase formed from the vinylaromatics is accordingly from 5 to 40, preferably from 10 to 30, in particular from 12 to 20, % by volume.

The block copolymers are unambiguously defined by the quotient of the proportion by volume of the soft blocks and the percentage by weight of diene in the soft blocks. In addition, the block copolymers are, as a rule, characterized by glass transition temperatures of from −50 to +25° C., in particular from −50 to +5° C.

The composition of the block copolymers may be on average homogeneous or inhomogeneous along the chain. The chain structure of the block copolymers may be linear or star-like. The composition can be described, for example, by the following general formulae:

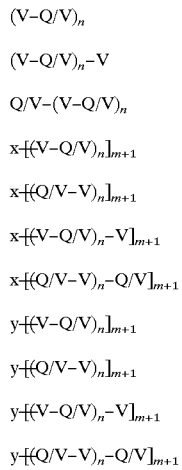

In these formulae, V is a hard phase comprising vinylaromatics, $Q/V_{m+1}$ is a soft block, X is a bifunctional or polyfunctional initiator and Y is a coupling center formed with a bifunctional or polyfunctional coupling agent. m and n are each an integer, beginning with one.

Preferred block copolymers have the structure V–Q/V–V, X–[Q/V–V]$_2$ or Y–[Q/V–V]$_2$, where the soft block Q/V itself may be subdivided into part-blocks. The soft block preferably consists of from 2 to 15, in particular from 3 to 10, random part-blocks.

The block copolymers may be prepared by living anionic polymerization in nonpolar solvents with the addition of polar cosolvents acting as Lewis bases. Preferably used solvents are aliphatic hydrocarbons, such as cyclohexane or methylcyclohexane. Suitable cosolvents are ethers, such as tetrahydrofuran, or aliphatic polyethers, eg. diethylene glycol dimethyl ether, or tertiary amines, such as tributylamine or pyridine.

Examples of initiators for the anionic polymerization are organometallic compounds, including methyllithium, ethyllithium, n-propyllithium, n-butyllithium, sec-butyllithium or tert-butyllithium.

The coupling center Y is formed by the reaction of the reactive anionic chain ends with a bifunctional or polyfunctional coupling agent. Such coupling agents are known per se. Divinylbenzene or epoxidized glycides, such as epoxidized linseed oil or soya bean oil, are preferred.

The anionic polymerization is carried out in a plurality of stages. A part of the monomers is initially taken in the reactor and the anionic polymerization is initiated by adding the initiator. In order to achieve a defined chain structure which can be calculated from the metering of the monomer and of the initiator, it is advisable to allow the reaction to proceed to high conversions ($\geq 99\%$) before the second monomer is added. However, this is not absolutely essential. The order of the monomer addition depends on the chosen block structure. In the case of monofunctional initiation, first vinylaromatic is either initially taken or directly metered in. Thereafter, diene and vinylaromatic should be added as far as possible simultaneously. The random structure and the composition of the soft block Q/V are determined by the metering of diene relative to vinylaromatic compound, the concentration and the chemical structure of the Lewis base as well as the reaction temperature. Thereafter, either the second hard phase V is polymerized by adding the vinylaromatic or coupling is effected with a coupling agent. In the case of bifunctional initiation, the soft block Q/V is first synthesized, followed by the hard phase V.

The block copolymers can be worked up by protonating the carbanions with an alcohol, such as isopropanol, acidifying the reaction mixture, for example with a mixture of $CO_2$ and water, and removing the solvent. The block copolymers may contain antioxidants and antiblocking agents.

Component E

The compositions contain, as component E, flameproofing agents in amounts of from 1 to 20, preferably from 1 to 18, in particular from 1 to 15, % by weight, based on the total composition.

Organophosphorus compounds, such as phosphates or phosphine oxides, may be used as flameproofing agents. Examples of phosphine oxides or triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis(cyclohexyl) phosphine oxide, benzylbisphenylphosphine oxide and phenylbis(n-hexyl)phosphine oxide. Triphenylphosphine oxide, tricyclohexylphosphine oxide, tris(n-octyl)phosphine oxide and tris(cyanoethyl)phosphine oxide are particularly preferably used.

Particularly suitable phosphates are alkyl- and aryl-substituted phosphates. Examples are phenyl bisdodecyl phosphate, phenyl bisneopentyl phosphate, phenyl ethyl hydrogen phosphate, phenyl bis(3,5,5-trimethylhexyl) phosphate, ethyl diphenyl phosphate, bis(2-ethylhexyl)p-tolyl phosphate, tritolyl phosphate, trixylyl phosphate, trimesityl phosphate, bis(2-ethylhexyl)phenyl phosphate, tris(nonylphenyl)phosphate, bisdodecyl p-tolyl phosphate, tricresyl phosphate, triphenyl phosphate, dibutyl phenyl phosphate, p-tolyl bis(2,5,5-trimethylhexyl)phosphate and 2-ethylhexyl diphenyl phosphate. Phosphorus compounds in which each radical R is aryl are particularly suitable. Triphenyl phosphate, trixylyl phosphate and trimesityl phosphate are very particularly suitable. Cyclic phosphates may also be used. Diphenyl pentaerythritol diphosphate is particularly suitable here.

In addition, mixtures of different phosphorus compounds may be used. For example, mixtures which are composed of α) at least one phosphine oxide of the general formula I

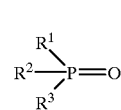

(I)

where $R^1$, $R^2$ and $R^3$ are identical or different alkyl, aryl, alkylaryl or cycloalkyl groups of 8 to 40 carbon atoms, and β) at least one phosphate of the general formula II

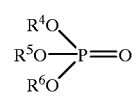

(II)

where $R^4$, $R^5$ and $R^6$ are identical or different alkyl, aryl, alkylaryl or cycloalkyl groups of 8 to 40 carbon atoms, and γ) a boron compound are preferred.

Mixtures of the following phosphine oxide α) and phosphate β) combinations are particularly preferred: triphenylphosphine oxide/triphenyl phosphate or trixylyl phosphate, tricyclohexylphosphine oxide and triphenyl phosphate, tris(cyanoethyl)phosphine oxide and triphenyl phosphate, tris(n-octyl)phosphine oxide and triphenyl phosphate. Mixtures of a plurality of phosphine oxides and phosphates may also be used, for example a mixture of triphenylphosphine oxide, triphenyl phosphate and trixylyl phosphate.

Boron compounds γ) are to be understood as meaning both inorganic and organic boron compounds.

Examples of inorganic boron compounds are boric acid, $B_2O_3$ and salts of boric acid, preferably with alkali or alkaline earth metals. Boric acid, sodium borate and boron oxide are particularly preferred.

Organic boron compounds γ) are, for example, tetraphenylborates, eg. sodium tetraphenylborate and tribenzyl borate.

The composition of the mixture is in general (based on the content of the total mixture)

α) from 1 to 98.9, preferably from 10 to 85, in particular from to 70, % by weight, β) from 1 to 98.9, preferably from 10 to 85, in particular from to 70, % by weight and γ) from 0.1 to 70, preferably from 5 to 50, in particular from 10 to 30, % by weight.

Organophosphorus compounds of the general formulae III to V

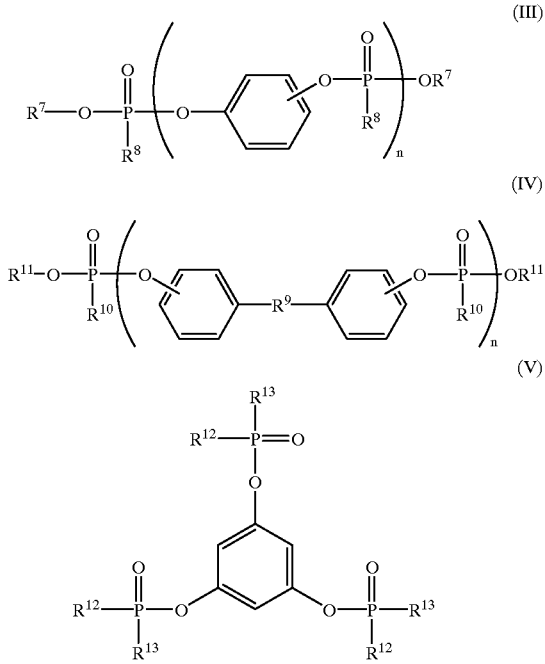

where $R^7$ and $R^{11}$ are each alkyl or aryl, $R^8$, $R^{10}$, $R^{12}$ and $R^{13}$ are each alkyl, aryl, alkoxy or aryloxy, n and p are each an integer from 1 to 30, $R^9$ is alkyl, —$SO_2$—, —CO—, —N=N— or $R^{14}$—P=O and $R^{14}$ is alkyl, aryl or alkylaryl, are also suitable flameproofing agents.

In general, mixtures of different oligomers or isomers of these organophosphorus compounds are used.

The molecular weight is in general not more than 1 000, preferably from 150 to 800.

Component F

The compositions may contain, as component F, additives or processing assistants or mixtures thereof. The amount of component F is in general from 0 to 60% by weight, based on the total composition. It is preferably not more than 50, in particular not more than 30, % by weight, based on the total composition.

Examples of additives are heat stabilizers and light stabilizers, lubricants and mold release agents, and colorants, such as dyes and pigments, in conventional amounts. Further additives are reinforcing agents, such as glass fibers, carbon fibers, aromatic polyamide fibers and/or fillers, gypsum fibers, synthetic calcium silicates, kaolin, calcined kaolin, wollastonite, talc and chalk.

Lubricants, such as polyethylene wax, are also suitable as additives.

Carbon blacks and titanium dioxide may be used, for example, as pigments.

When $TiO_2$ is used, the mean particle size is as a rule from 50 to 400 nm, in particular from 150 to 240 nm. Rutile and anatase, which may be coated with metal oxides, eg. aluminas, silicas, oxides of zinc or siloxanes, are used industrially.

Carbon blacks are to be understood as meaning microcrystalline, finely divided carbons (cf. Kunststofflexikon, 7th Edition 1980).

Furnace blacks, acetylene blacks, gas blacks and the thermal carbon blacks obtainable by thermal preparation are suitable examples.

The particle sizes are preferably from 0.01 to 0.1 μm and the surface areas are from $10^2$ to $10^4$ m$^2$/g (BET/ASTM D 3037), in the case of DBP absorption from $10^2$ to $10^3$ ml/100 g (ASTM D 2414).

The novel thermoplastic molding materials are advantageously prepared by mixing the components at from 250 to 320° C. in a conventional mixing apparatus, such as a kneader, a Banbury mixer or a single-screw extruder, preferably in a twin-screw extruder. Thorough mixing is required for obtaining a very homogeneous molding material. The order in which the components are mixed may be varied; two or, if required, three components may be premixed or all components may be mixed together.

The novel thermoplastic molding materials can be converted into moldings, for example by injection molding or extrusion. They can furthermore be used for the production of films or semifinished products by the deep drawing or blow molding method.

EXAMPLE

Compositions were prepared from the following components and subjected to performance tests:

Components $A_1$, $A_2$ and $A_{\nu}$ $A_1$: Polystyrene:$M_w$=860 000 g/mol, $M_w/M_n$=1.7

$A_2$: Polystyrene:$M_w$=1×10$^6$ g/mol, $M_w/M_n$=1.8

$A_{\nu}$: Polystyrene:$M_w$=950 000 g/mol, $M_w/M_n$=4.8

Component $B_1$

Poly-2,6-dimethyl-1,4-phenylene ether having an average molecular weight ($M_w$) of 40 000 g/mol.

Components $C_1$ and $C_2$ $C_1$: High impact polystyrene ($M_w/M_n$=2.4) containing 9% by weight of polybutadiene and having cellular particle morphology and a mean particle size of the soft component of 1.9 μm. The viscosity number (VN) of the hard matrix was 80 ml/g (0.5% strength in toluene at 23° C.)

$C_2$: High impact polystyrene ($M_w/M_n$=2.3) containing 11% by weight of polybutadiene and having cellular particle morphology and a mean particle size of the soft component of 3.5 μm. The viscosity number (VN) of the hard matrix was 80 ml/g (0.5% strength in toluene at 23° C.)

Component $D_1$

Hydrogenated styrene/butadiene/styrene three-block copolymer (eg. SEPS block rubber Kraton® G 1650 from Shell AG).

Components $E_1$ and $E_2$ $E_1$: Triphenyl phosphate (eg. Diflamoll® TP from Bayer AG)

$E_2$: Resorcinol diphosphate (eg. Fyroflex® RDP from Akzo)

Component $F_1$

Carbon black (eg. Black Pearls® 880 from Cabot) (as a 15% strength batch in polystyrene, $M_w/M_n$=2.4; viscosity number (VN) 80 ml/g, 0.5% strength in toluene at 23° C.).

Components A to F were mixed in a twin-screw extruder (ZSK 30 from Werner & Pfleiderer) at 280° C., the mixture was extruded and the extrudate was cooled and granulated.

The dried granules were processed at from 260 to 280° C. to give circular disks (thickness 2 mm, diameter 60 mm), flat bars (127×12.7×1.6 mm) and standard small bars, and were tested.

Testing of Performance Characteristics

The damaging energy $W_s$ was determined according to DIN 53 443. For this purpose, circular disks were penetrated at a speed of 4.6 m/s. The damaging energy was determined from the force-distance diagram. The mean value of five individual measurements is stated.

The heat distortion resistances of the samples were determined for standard small bars according to DIN 53 460, by means of the Vicat softening temperature.

The notched impact strengths ($a_k$) were each determined according to ISO 179 IeA.

In order to measure the flame resistances and the dripping behavior, a flame was applied to the flat bars according to UL-4294.

A flameproofed thermoplastic is classified in fire class UL-94 V0 when the following criteria are met:

In the case of a set of 5 samples having the dimensions 127×12.7×1.6 mm, no samples may continue burning for longer than 10 seconds after application of an open flame (height 19 mm) twice for the duration of 10 seconds. The sum of the subsequent combustion times in the case of 10 flame applications to 5 samples must not be greater than 50 seconds. There must be no dripping of flaming particles, complete combustion or glowing for longer than 30 seconds. Classification in fire class UL 94 V1 requires that the subsequent combustion times are no longer than 30 seconds and that the sum of the subsequent combustion times for 10 flame applications to 5 samples is not greater than 250 seconds. Glowing must not last longer than 60 seconds. The other criteria are identical to those mentioned above. Classification in fire class UL-94 V2 is relevant when the additional criteria for classification UL-94 V1 are met and dripping of flaming particles occurs.

The flow behavior was investigated using a capillary rheometer at 250° C. The melt stability was determined at 320° C. by measurement in the capillary rheometer at a measuring frequency of 55 Hz, the percentage change in the melt viscosity in the course of 30 minutes being used as a measure of the processing stability.

The compositions and properties of the thermoplastic molding materials are listed in Table 1.

TABLE 1

| Example No. | V1 | V2 | 1 | 2 | V3 | V4 | 3 | 4 |
|---|---|---|---|---|---|---|---|---|
| Component [% by wt.] | | | | | | | | |
| $A_1$ | — | — | 2.5 | — | — | — | 2.5 | 2.5 |
| $A_2$ | — | — | — | 2.5 | — | — | — | — |
| AV | — | 2.5 | — | — | — | 2.5 | — | — |
| $B_1$ | 40 | 40 | 40 | 40 | 40 | 40 | 40 | 40 |
| $C_1$ | 44.7 | 42.2 | 42.2 | 42.2 | 42.7 | 40.2 | 40.2 | 36.2 |
| $C_2$ | — | — | — | — | — | — | — | 4 |
| $D_1$ | 3 | 3 | 3 | 3 | 3 | 3 | 3 | 3 |
| $E_1$ | 10 | 10 | 10 | 10 | — | — | — | — |
| $E_2$ | — | — | — | — | 11 | 11 | 11 | 11 |
| F | 3.3 | 3.3 | 3.3 | 3.3 | 3.3 | 3.3 | 3.3 | 3.3 |

TABLE 1-continued

| Example No. | V1 | V2 | 1 | 2 | V3 | V4 | 3 | 4 |
|---|---|---|---|---|---|---|---|---|
| Properties | | | | | | | | |
| $W_s$ [Nm] | 26 | 24 | 25 | 25 | 32 | 32 | 33 | 36 |
| Vicat B [° C.] | 112 | 112 | 112 | 112 | 106 | 106 | 106 | 105 |
| $a_k$ [kJ/m$^2$] | 9.1 | 8.9 | 9.0 | 9.2 | 10.3 | 10.0 | 10.6 | 11.5 |
| UL 94 | V-2 | V-2 | V-1 | V-1 | V-2 | V-2 | V-0 | V-0 |
| (bars dripped) | (5) | (5) | | | (5) | (5) | | |
| η 10 Hz [Pa · s] | 2111 | 2340 | 2176 | 2190 | — | — | — | — |
| η 100 Hz [Pa · s] | 811 | 864 | 835 | 830 | — | — | — | — |
| Δ [%] | 76 | 93 | 78 | 79 | 73 | 96 | 74 | 76 |

V: for comparison
Δ: $(\eta_s' - \eta_{30}')/\eta_s' \times 100$ [%]

The thermoplastic molding materials which contain the novel anti-drip agents have good mechanical properties, good flow and little tendency to drip.

What is claimed is:

1. A composition containing
    A) from 0.5 to 25% by weight of halogen-free antidrip agents, containing polymers based on vinylaromatic monomers having molecular weights ($M_w$) of at least 800,000 g/mol and a molar mass distribution, expressed by the ratio of weight average value $M_w$ to number average value $M_n$, of 2 or less,
    B) from 5 to 97.5% by weight of polyphenylene ether,
    C) from 1 to 93.5% by weight of vinylaromatic polymers which differ from those in the polymers containing halogen-free antidrip agents,
    D) from 0 to 50% by weight of impact modifiers,
    E) from 1 to 20% by weight of flameproofing agents and
    F) from 0 to 60% by weight of additives or processing assistants or mixtures thereof.

2. A composition as claimed in claim 1, containing halogen-free antidrip agents in which the vinylaromatic monomers are styrene.

3. A composition as claimed in claim 1, containing halogen-free antidrip agents in which the polymers based on vinylaromatic monomers are prepared by anionic emulsion polymerization.

4. A molding, film or fiber containing a composition as claimed in claim 1.

* * * * *